Sept. 15, 1931.  J. E. JEWETT ET AL  1,823,147
GEARING
Filed Sept. 23, 1925   2 Sheets-Sheet 1
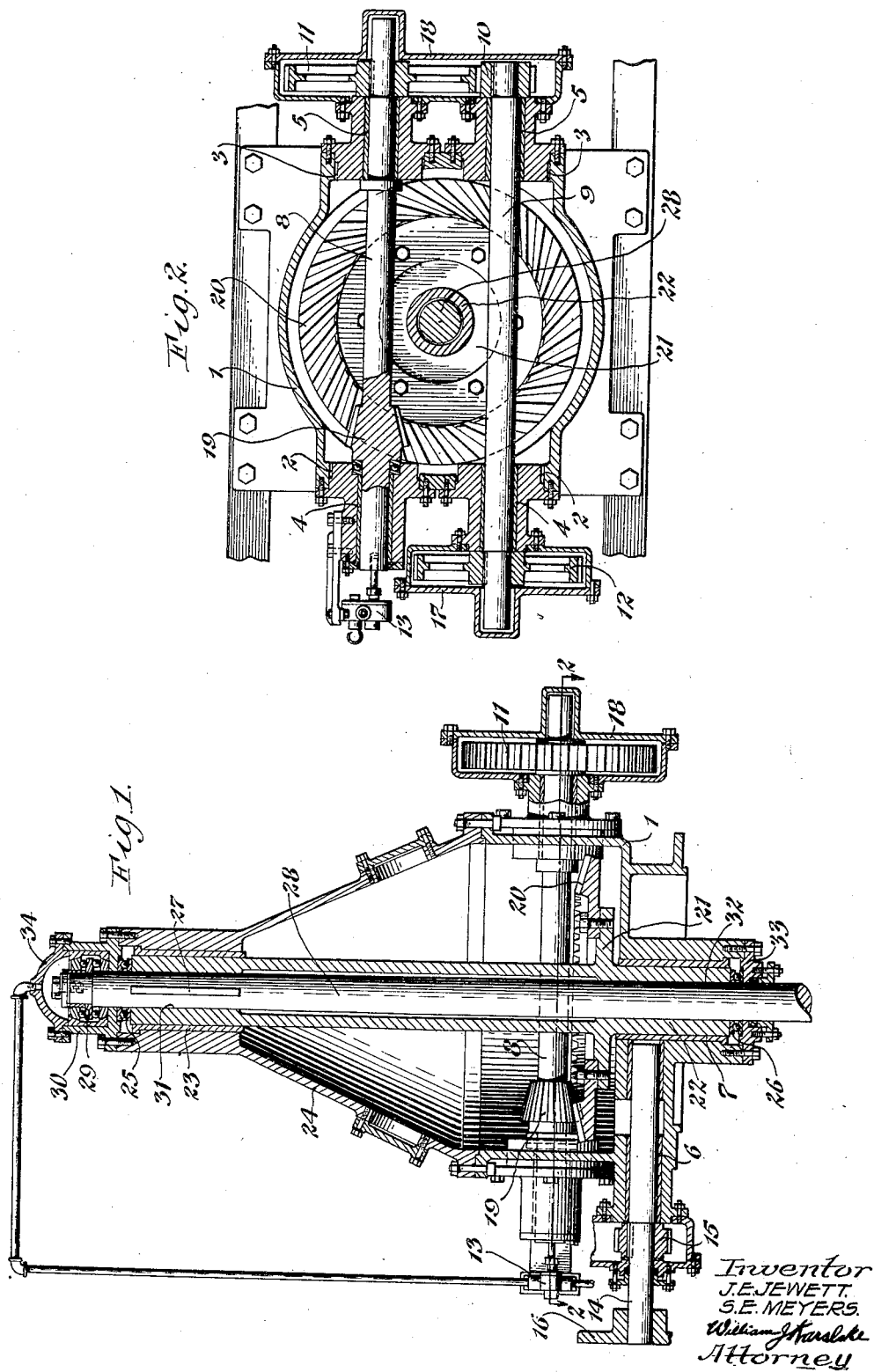
Inventor
J. E. JEWETT.
S. E. MEYERS.
Attorney

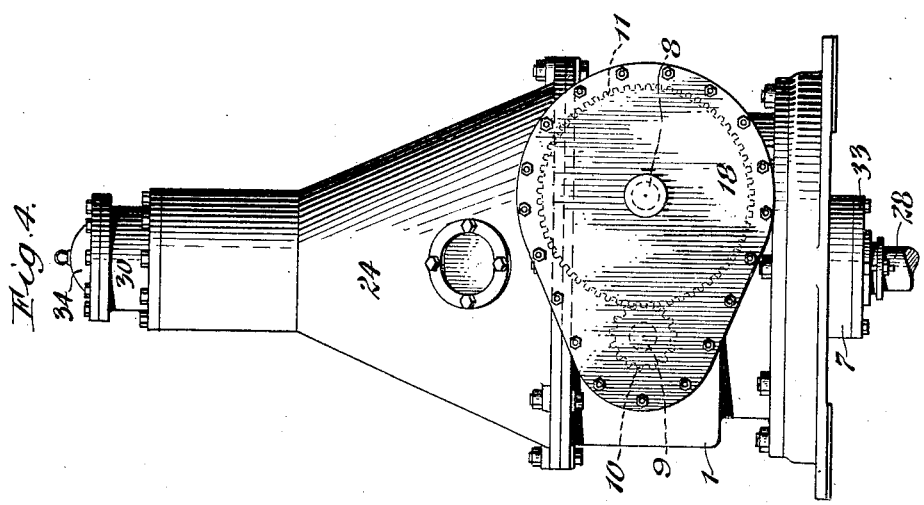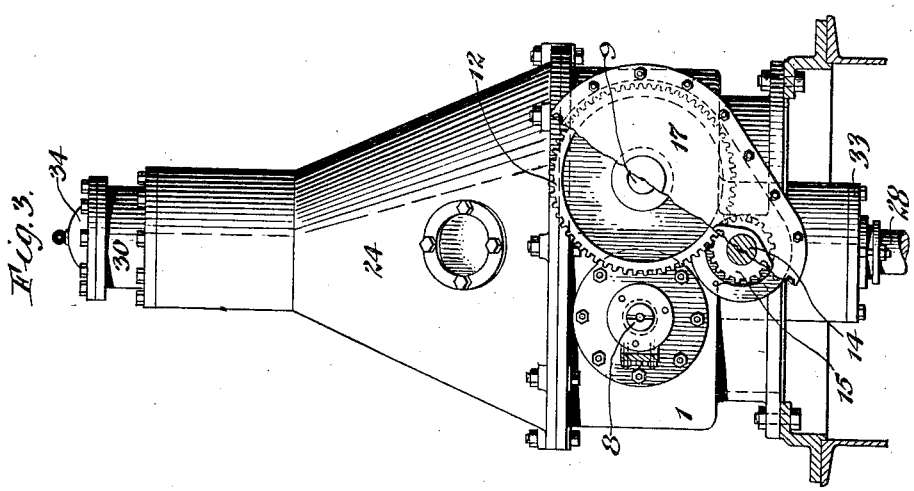

Patented Sept. 15, 1931

1,823,147

UNITED STATES PATENT OFFICE

JOSEPH E. JEWETT AND SIDNEY E. MEYERS, OF BUFFALO, NEW YORK, ASSIGNORS TO NATIONAL ANILINE & CHEMICAL CO., INC., OF NEW YORK, N. Y., A CORPORATION OF NEW YORK

GEARING

Application filed September 23, 1925. Serial No. 58,057.

This invention relates to speed reduction gearing in which there is a change in the direction of the drive.

For dissimilar planes of shaft rotation, it is customary to use bevel gears with an overhang of one of the gears, that is, the gear has effective bearing support on one side only. However, there is an inherent instability in the use of the overhanging gear, as the gears tend to separate and chatter, particularly when changeable loads are encountered. If, in addition to the bevel gears, further speed reduction is required, the customary bevel gearing necessitates an association of the reducing gear elements entirely apart from it, resulting in a cumbersome and space occupying structure. Furthermore, in many applications of reduction gearing, substantial changes in speed reduction are necessary.

This invention has for an object a gearing having a change in the direction of the drive without overhanging gears. Another object is such a gearing that is combined with reduction gearing in a compact and stable arrangement. A further object is an arrangement providing a ready interchange of gears to cover a wide range of speed changes. In addition, the invention contemplates a construction that permits the removal of shafting without disturbing the gearing or its mounting. These and other objects will appear from the following description.

In the drawings:

Fig. 1 is a vertical section of a gear assembly embodying the invention;

Fig. 2 is a horizontal section on the line 2—2 of Fig. 1, omitting the lower shaft and gear; and Figs. 3 and 4 are end views of the assembly.

A substantially dust-proof oil retaining housing 1 has openings 2 and 3 at either end to receive bearings 4 and 5. Below the plane of these openings and in the middle of the housing there extends another bearing 6 made integral with the housing. A boss 7 projects from the bottom of the housing forming a bearing.

In the bearings 4 and 5, a pair of parallel shafts, 8 and 9, are journaled. These shafts are geared together at one end by pinion 10 and gear 11. At the other end, the shaft 9 carries a spur gear 12, and to the shaft 8 is secured an oil pump 13. A driving or stub shaft 14 is carried by the bearing 6, and has a pinion 15 thereon in mesh with the gear 12. A coupling flange 16 on the end of the shaft 14 provides attachment to a suitable driving means. With this arrangement of shafts, the drive is from the shaft 14, through pinion 15 to gear 12, then through the shaft 9 to the pinion 10 and gear 11 and shaft 8, two reductions in speed being thus provided. The gears are covered by substantially dust-proof oil retaining housings 17 and 18.

The shaft 8 has formed thereon intermediate its bearings, a skew bevel pinion 19. The pinion meshes with a complementary skew bevel gear 20. The gear 20 is an annular disc and is bolted to a flange 21 formed on a driven shaft 22. The shaft 22 extends perpendicularly or in angular relation and in close proximity between the shafts 8 and 9, and is journaled at its lower end in the bearing formed in the boss 7. The upper end of the shaft 22 is held by a bearing 23 carried by a casing 24 that is bolted to the housing 1. The end thrust of the shaft 22 is taken up by the end bearings 25 and 26.

The shaft 22 is hollow and secured within it by a key 27, is a shaft 28, so that the shaft 28 is driven by shaft 22 and both shafts rotate at the same speed. The shaft 28 is supported by a thrust bearing 29 which is housed within a cap 30. Side thrust on the shaft 28 is transmitted through the contact surfaces 31 and 32 on the hollow shaft 22 and thus to the bearings 7 and 23.

The end thrust bearings 25 and 26 are held in place by the cap 30 at the upper end and a plate 33 at the lower end, and the cap and the plate are so connected to the housing that they are interchangeable. By this means, the shaft 28 may be extended from either end of the housing 1, and the housing itself placed in any desired position. A demountable portion 34 of the cap permits withdrawal of the shaft 28 through the cap without disturbing the housing or the elements mounted therein.

As the parallel shafts ride in bearings that are fixed to the housing, and therefore in fixed relation to each other, the gears carried on the ends of these shafts may be interchanged. Numerous speed ratios are therefore possible by merely changing the spur gear sets associating the shafts.

Moreover the bevel wheel, being a separate ring, can be substituted by another ring of different size and pitch. Substitution of a corresponding pinion requires a withdrawal of the pinion-carrying shaft 8 and the substitution of another, and this is readily done by releasing the bearing 4 and withdrawing the shaft. Further speed ratios are thus provided. Consequently a very wide range of speeds is thus possible with the interchangeable bevel gears in association with the spur gear sets.

The entire mechanism runs in oil and the pump 13 is connected to draw oil from the housing 1 and discharge it into the cap 30. The oil returns by gravity to the housing 1.

The construction described gives a stable gear arrangement for changing the direction of the drive, as the bevel pinion and also the bevel gear are on shafts which rotate in bearings located on both sides of the gears. Skewed gearing places the pinion shaft partly within the projected periphery of the bevel gear and to one side of the vertical shaft. This arrangement in connection with reduction gearing on either end of the pinion shaft gives a compact gearing, as the reduction gearing shafts are substantially in a plane substantially parallel to the bevel gear and in close proximity thereto (that is, the reduction gearing shafts lie substantially in a plane in proximity to the direction changing gearing), and both shafts and reduction gearing are approximately within the space limits required by the bevel gearing.

The hollow shaft, by which the driven shaft is rotated, affords a means for the removal or disengagement of the driven shaft without dismantling the gearing or disturbing its mounting. To do so merely requires the removal of the cap portion 34 and sliding the shaft through the cap. Also the parallel shafts are readily withdrawn by releasing one of the bearings in which they are mounted.

Gear changes are quickly made by removing the housing cover and withdrawing the gears from the projecting shaft ends. New gears, having the same distance between their axes when in mesh as the shaft axes, can then be substituted.

We claim:

1. Gearing comprising in combination a shaft, a pair of shafts on either side of and in an angular relation to said first named shaft, reduction gearing associating said pair, and bevel gearing connecting said first named shaft and only one of said pair.

2. Gearing comprising in combination a shaft, a gear on said shaft, a pair of shafts on either side of and in angular relation to said first named shaft, said pair extending within the periphery of said gear, reduction gearing in proximity to said gear periphery associating said pair, and gearing connecting said first named shaft and one of said pair.

3. Gearing comprising in combination a casing, a shaft journaled in opposite sides of said casing, a gear secured on said shaft within the casing, a pair of shafts on either side of and in angular relation to said first named shaft, said pair being journaled in said casing, gearing in close proximity to said casing, associating said pair, and a pinion on one of said pair in mesh with said gear.

4. Gearing comprising in combination a casing, housings on either side of said casing, oppositely disposed bearings in said casing in angular relation to said housings, a shaft journaled in said bearings, gears in said housings, shafts extending across said casing and connecting said gears, and gearing associating the first named shaft and one of the remaining shafts.

5. A drive assembly comprising in combination a casing, oppositely disposed bearings in said casing, a shaft journaled in said bearings, a pair of shafts supported by said casing in angular relation to said shaft and on either side thereof, a stub shaft mounted on said casing, gearing associating said pair, gearing associating said first named shaft and one of said pair, and gearing associating the stub shaft and the other of said pair.

6. A drive assembly comprising in combination a casing, a driven shaft journaled in said casing, a pair of shafts carried by and extending across said casing in angular relation to said driven shaft, a drive shaft supported by said casing, gearing on one side of the periphery of said casing associating said pair, gearing on the opposite side of said casing associating said drive shaft and one of said pair of shafts, and gearing within the casing associating the driven shaft and the other of said pair of shafts.

7. A drive assembly comprising a casing, a hollow shaft having bearings in contact with opposite ends of said casing, gearing associated with said hollow shaft, a readily removable shaft within and keyed to said hollow shaft, and means mounted on the casing for restricting end movement of said removable shaft in either direction.

8. A drive assembly comprising a casing, a hollow shaft having bearings in contact with opposite ends of said casing, gearing associated with said shaft, a removable shaft within said hollow shaft, and means attachable to either end of said casing for restricting end movement of said removable shaft in either direction.

9. Gearing comprising in combination a casing, a hollow shaft journaled in said casing, a skew bevel gear carried by said shaft, a removable shaft within and keyed to said hollow shaft, a pair of shafts upon either side of said hollow shaft lying in close proximity to said gear and substantially in a plane in angular relation to said hollow shaft, reduction gearing associating said pair of shafts, and a pinion carried by one of said pair of shafts cooperating with said bevel gear.

10. Gearing comprising in combination a casing, a hollow shaft journaled in said casing, a skew bevel annular gear secured to said shaft, a removable shaft within and keyed to said hollow shaft, removable and interchangeable thrust bearings for said shafts, parallel shafts journaled in said casing, said parallel shafts lying on either side of said hollow shaft and substantially in a plane parallel to said gear, a skew bevel pinion on one of said shafts cooperating with said gear, and removable gears associating said parallel shafts.

11. A drive assembly comprising a casing, a hollow shaft having bearings in contact with opposite ends of said casing, gearing associated with said hollow shaft, a readily removable shaft within and loosely keyed to said hollow shaft, and means mounted on the casing for separately restricting end movement of said hollow shaft and said removable shaft in either direction.

12. A drive assembly comprising a casing, a hollow shaft having bearings in contact with opposite ends of said casing, gearing associated with said hollow shaft, a removable shaft within and keyed to said hollow shaft, said removable shaft being adapted to be reversibly mounted within said hollow shaft, a casing cap enclosing one end of said removable shaft, a double thrust bearing for said removable shaft mounted in said cap, and an oil retaining cap having an opening therein for said removable shaft, said caps being interchangeable upon reversal of said shaft.

13. Gearing comprising in combination a casing, drive direction changing gearing within said casing, shafts extending through said casing, and reduction gearing mounted on said shafts on either exterior side of said casing, said shafts lying substantially in a plane in proximity to said gearing, and one of said shafts being associated with said gearing.

In testimony whereof we affix our signatures.

JOSEPH E. JEWETT.
SIDNEY E. MEYERS.